US007885969B2

(12) United States Patent
Natarajan et al.

(10) Patent No.: US 7,885,969 B2
(45) Date of Patent: Feb. 8, 2011

(54) SYSTEM AND METHOD FOR EXECUTING COMPUTE-INTENSIVE DATABASE USER-DEFINED PROGRAMS ON AN ATTACHED HIGH-PERFORMANCE PARALLEL COMPUTER

(75) Inventors: Ramesh Natarajan, Pleasantville, NY (US); Michael Kochte, Lorch (DE)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 11/856,130

(22) Filed: Sep. 17, 2007

(65) Prior Publication Data

US 2009/0077011 A1 Mar. 19, 2009

(51) Int. Cl.
*G06F 7/00* (2006.01)
(52) U.S. Cl. .................. 707/764; 707/655; 707/704
(58) Field of Classification Search ............ 707/764, 707/704, 705, 706, 655
See application file for complete search history.

(56) References Cited

U.S. PATENT DOCUMENTS

| 5,495,606 | A * | 2/1996 | Borden et al. ............... 1/1 |
| 5,754,841 | A * | 5/1998 | Carino, Jr. ................. 707/3 |
| 5,835,755 | A * | 11/1998 | Stellwagen, Jr. ........... 707/764 |
| 6,182,061 | B1 * | 1/2001 | Matsuzawa et al. ......... 707/737 |
| 6,618,718 | B1 * | 9/2003 | Couch ....................... 707/718 |
| 7,249,138 | B1 * | 7/2007 | Wasserman ................ 705/35 |
| 2003/0033279 | A1 * | 2/2003 | Gibson et al. .............. 707/705 |
| 2004/0103218 | A1 * | 5/2004 | Blumrich et al. ........... 709/249 |

OTHER PUBLICATIONS

Benjamin Lee, "Methods of Inference and Learning for Performance Modeling of Parallel Applications," ACM, PPoPP '07, Mar. 14-17, 2007.*

* cited by examiner

*Primary Examiner*—Shahid A Alam
*Assistant Examiner*—Alexandria Y Bromell
(74) *Attorney, Agent, or Firm*—Scully, Scott, Murphy & Presser, P.C.; Stephen C. Kaufman, Esq.

(57) ABSTRACT

The invention pertains to a system and method for dispatching and executing the compute-intensive parts of the workflow for database queries on an attached high-performance, parallel computing platform. The performance overhead for moving the required data and results between the database platform and the high-performance computing platform where the workload is executed is amortized in several ways, for example,

- by exploiting the fine-grained parallelism and superior hardware performance on the parallel computing platform for speeding up compute-intensive calculations,
- by using in-memory data structures on the parallel computing platform to cache data sets between a sequence of time-lagged queries on the same data, so that these queries can be processed without further data transfer overheads,
- by replicating data within the parallel computing platform so that multiple independent queries on the same target data set can be simultaneously processed using independent parallel partitions of the high-performance computing platform.

A specific embodiment of this invention was used for deploying a bio-informatics application involving gene and protein sequence matching using the Smith-Waterman algorithm on a database system connected via an Ethernet local area network to a parallel supercomputer.

3 Claims, 6 Drawing Sheets

```
select * from table(ssearch_call('drosoph','query sequence',
'MPMILGYWNVRGLTHPIRMLLEYTDSSYDEKRYTMGDAPDFDRSQELNEKFKLGDFP
NLPYLI', 6)) as A
```

Description of Arguments to search_call in Query:

'drosoph' is the library/partition name against which the matching query is executed.
'query sequence' is the name/description of the query sequence, may be deprecated.
'MP.....' is the query sequence for which the match is desired.
'6' is a request to show the top 10 hits in the result set of the query.

This query returns the result table below, where ID is a database internal integer id for sequences.

| ID   | SW | E                    | Z                    | BIT                  |
|------|----|----------------------|----------------------|----------------------|
| 1280 | 0  | +8.2268362792282E-001 | +1.0628530128265E+002 | +2.7213158931229E+001 |
| 1070 | 0  | +1.0807210627209E+000 | +1.0415819457665E+002 | +2.6819574362031E+001 |
| 1191 | 0  | +1.4196927904809E+000 | +1.0203108787065E+002 | +2.6425989792833E+001 |
| 296  | 0  | +3.2183751063398E+000 | +9.5649767752663E+001 | +2.5245236085239E+001 |
| 927  | 0  | +5.5539016220251E+000 | +9.1395554340667E+001 | +2.4458066946843E+001 |
| 127  | 0  | +5.5539016220251E+000 | +9.1395554340667E+001 | +2.4458066946843E+001 |

FIG. 6

SYSTEM AND METHOD FOR EXECUTING COMPUTE-INTENSIVE DATABASE USER-DEFINED PROGRAMS ON AN ATTACHED HIGH-PERFORMANCE PARALLEL COMPUTER

FIELD OF THE INVENTION

The present invention generally relates to performance enhancements for database processing, and more particularly, to a system and method for speeding up compute-intensive database queries by dispatching and executing the compute-intensive parts of query workflow on an attached high-performance parallel computer (HPC) system.

BACKGROUND OF THE INVENTION

The present invention is concerned with a system and method for speeding up database queries by dispatching and executing the relevant compute-intensive parts of the query workflow on an attached high-performance parallel computer (HPC) system.

SUMMARY OF THE INVENTION

This invention is motivated by the observation that commercial databases, which have traditionally been used for applications in transactional processing, online analytics and data warehousing, are increasingly being used for storing, querying and analyzing a variety of complex data types such as text, images and multimedia. Commercial databases are also increasingly being used for handling raw event streams from scientific instruments, or for storing the unprocessed result sets from high-performance computer simulations (see J. Becla and D. L. Wong, "Lessons Learned From Managing a Petabyte," Conference On Innovative Data Systems Research, Asilomar Calif. (2005)).

The relevant analysis with this raw data stored in the database as a complex data type, often goes beyond simple archival and retrieval to include certain compute-intensive operations and data transformations that are generally useful across a variety of external applications with this data, such as high-level semantic query and search, content-based indexing, sophisticated data modeling, data mining analytics, and computer-aided design. These compute-intensive operations and data transformations may be implemented as embedded programs within database extenders, which comprise of a collection of user-defined stored procedures or user-defined functions over these complex data types, that provide the necessary transformations of the raw complex data type to representations that are appropriate for sophisticated external applications. As a result, these embedded database extenders (which may be implemented by people with skilled expertise in the art) provide external application developers with the relevant functionality and transformations for using these complex data types in their applications, using the familiar set-oriented or SQL-based syntax and query interface for invoking these transformations. Furthermore, the use of embedded user-defined programs often reduces the overhead of moving the raw data from the database server across the network to the client application, either by virtue of providing a more compressed representation of the raw data, or by a substantial pre-filtering of the raw data on the database server itself before the data transmission to the client application. Finally, the use of embedded user-defined programs makes it easier to ensure the privacy, integrity and coherence of the raw data within the database, by providing "object-like" interface to the raw data, which does not have to be copied or shared with the external applications.

However, notwithstanding the advantages given above, the associated processing requirements for executing compute-intensive, user-defined programs on the database server can be extremely large, and this currently this aspect is rarely addressed in conventional database performance benchmarks, or in the design and sizing of the hardware platforms for general-purpose database server systems.

Large-scale, commercial database systems are typically hosted on shared-memory multiprocessors or on network-clustered computer platforms. On these platforms, the underlying parallelism is usually only exposed to the database controller software that coordinates the execution of the parallel query plan generated by the query optimizer, and concomitantly, this underlying parallelism is typically not exposed to any application software or embedded user-defined programs. In some cases, the execution of user-defined functions can implicitly piggy-back on the parallel query plan that is generated by the query optimizer to take advantage of the multi-threading or data partitioning parallelism for scheduling the query execution. However, commercial databases often impose default restrictions or even explicitly disallow many kinds of user-defined functions from implicit parallel execution in this fashion. For example, default restrictions on parallel execution often apply to user-defined functions that use scratchpad memory for storing information between repeated function invocations, that perform external actions such as file input-output operations, or that involve non-deterministic execution (i.e., in which the function may return different output values for the same inputs, with an example being a random number generator), or for user-defined table functions that return multiple rows of values at each function invocation (see Chapter 6 in D. Chamberlin, "A Complete Guide to DB2 Universal Database, Morgan-Kaufman, San Francisco, 1998 for a detailed discussion of these default restrictions in a specific commercial database). Furthermore, although these default restrictions may be over-ridden by the programmer in specific cases where "safe" serial semantics are preserved in the implicit parallel execution, the level of parallelism that can be used for the execution of these user-defined programs is restricted by the pre-configured parameters in the database platform that specify the maximum number of threads on a shared memory platform, or the maximum number of data partitions or processors in a distributed cluster platform, even though the application may be capable of exploiting parallelism at a much higher level of granularity. Furthermore, while these database configuration parameters may be set to the maximum values supported by the underlying hardware platform, even within this range, the parallel granularity that is optimal for each individual database application will depend on a complex interplay of factors involving the level of parallel co-ordination, synchronization, load balance and data movement in each application, and it is unlikely that there will be one global setting that is optimal for all the applications that run on the database server. Finally, in this scenario, improving the database performance for even a single application beyond the limitations imposed by the existing hardware parallelism will require an overall and expensive upgrade of the entire database platform.

In summary, therefore, existing commercial database systems only expose the underlying control or data parallelism to the query processing engine and database controller. These database systems do not provide specific application programming interfaces (API's) for writing general-purpose, parallel, user-defined stored procedures and user-defined functions, or for tuning the scalable performance of individual applications on a case-by-case basis either within or extending beyond the pre-configured limitations of the database platform.

There have been many proposals for improving database query processing performance based on using special-purpose hardware accelerators within a more generic database server platform. For example, K. C. Lee, T. M. Hickey and V. W. Mak, "VLSI Accelerators for Large Database Systems," IEEE Micro, vol. 11, pp. 8-20 (1991) collected profiling statistics from database query workloads to identify the most expensive operations, and proposed using special-purpose VLSI hardware filters in the data path between the disk storage interface and the CPU to handle these specific operations (which included associative search and aggregation operations). Similar ideas have also been advocated in P. Faudemay and M. Mhiri, "An Associative Accelerator for Large Databases," IEEE Micro, vol. 11, pp. 22-34, and M. Abdelguerfi and A. K. Sood, "A Fine-Grain Architecture for Relational Database Aggregation Operations," IEEE Micro, vol. 11, pp. 35-43). The use of hardware accelerators for text-oriented database applications, specifically for string and pattern matching, is described in V. W. Mak, K. C. Lee, and O. Frieder, "Exploiting Parallelism in Pattern Matching: An Information Retrieval Application," ACM Transactions on Information Systems, Vol. 9, pp. 52-74, 1991. A more recent evolution of this approach is "active-disk" technology, which takes advantage of the general-purpose microprocessors that are increasingly replacing the custom-designed circuits at the disk controller interface (E. Riedel, C. Faloutsos, G. A. Gibson and D. Nagle, "Active Disks for Large-Scale Data Processing," IEEE Computer, Vol. 34, pp. 68-74, 2001). In this approach, some of the query processing workload (which would normally be performed on the main CPU of the database server) is off-loaded to these individual microprocessors at the disk controller interface. This approach exploits the much higher degree of parallelism at the storage interface in the multi-disk systems typically used in commercial databases, to achieve a substantial pre-filtering and reduction in the data volume that is transmitted to the main CPU via the storage system interconnect for many database queries. There are limitations on the nature of the workload that can be off-loaded in this way, and particularly since the individual disk controllers do not communicate with each other, the off-loaded tasks are limited to simple data filtering and transformation operations on their respective data streams. In summary, although the use of embedded hardware accelerators can be very effective for simple predicate processing on simple data types, the overall approach does not yet have the flexibility and programmability for more complex operations that require parallel synchronization and communication.

The discussion above has motivated the need for an invention whereby compute-intensive, parallel user-defined programs can be executed on a separate and distinct HPC platform rather than on the performance-limited database server. The main performance limitation in this approach, as mentioned earlier, is the overhead of data movement between the database server and HPC platform, even though for very long-running computations the computational performance gains on the HPC platform may significantly offset or amortize these data transfer overheads. One concern with this approach is that general database users may need some specialized expertise in order to execute the required programs on the HPC platform. In addition, it is difficult with this approach to compose complex database queries within the SQL framework with these parallel user-defined programs, since the user is required to explicitly schedule the necessary compute-intensive operations on the external HPC platform, using an ad hoc and non-automated approach.

Our invention therefore is based on using this external HPC platform as a back-end compute server to the database platform (so that the application end-user is substantially isolated from the use of this HPC platform in the query execution process, unlike the front-end configuration described in the previous paragraph). Although this does not obviate the performance penalty for moving data and results between the database server and back-end HPC platform, various data caching strategies can be used to ensure the same level of performance in this approach, as that in an equivalent front-end client implementation by a skilled programmer in which the data movement and management is explicitly managed and optimized. Furthermore, the data movement in the present invention takes place in a tightly-controlled systems environment, comprising of the database server and the back-end parallel computer system, which makes it easier to introduce database logic to ensure data integrity and coherence, or to use special-purpose hardware and protocols that can improve the data-transfer performance between the database server and the back-end HPC platform. The "developer" expertise required in this invention is for programming and installing the computational services on the back-end HPC system, and once that is done, as far as the client application or end-user is concerned, the overall query execution then takes place just as if the equivalent embedded user-defined program had been executed on the database server itself. In summary, the various steps required for the fulfillment of the query, including the required data movement, the off-loading of the compute-intensive operations, and the return of the results, all take place in a automated fashion without any explicit user scheduling or synchronization. Therefore the approach taken in this invention does not impact the important ability to be able to compose complex database queries within the usual SQL query-processing framework, in spite of using off-loaded user-defined programs (an example of this is discussed in the specific embodiment of our invention described below).

The applicability of our invention can be found in several application area, and we particularly consider the field of bio-informatics and life sciences from which the specific embodiment of our invention described below has been taken.

This specific embodiment considered here is in the algorithms used for sequence similarity and alignment in DNA and protein sequence databases. In recent years, the amount of gene and protein sequence data has been growing rapidly, and this data is now being stored in a variety of data repositories including commercial relational databases, as well as proprietary, non-relational databases using a variety of formats. An essential task in bio-informatics is the comparison of a new sequence or sequence fragment against a subset of sequences in an existing sequence repository in order to detect sequence similarities or homologies. The resulting matches are then combined with other scientific data and metadata on the closely matching sequences (such as conformation and structural details, experimental data, functional annotations etc.) in order to provide information for further biological or genomic investigation on the new sequence. Since many of the steps in this process require information integration and aggregation, this task is greatly facilitated if the entirety of this sequence data and metadata, as well as the sequence matching algorithms, is accessible from an SQL query interface. One approach for achieving this (often termed as the extract/transform/load approach) is to import the relevant sequence libraries into a commercial relational database from the original data formats, which will require custom loader scripts for each proprietary data format in which the original sequence libraries and metadata are stored. An alternative approach, as described in L. M. Haas, P. M. Schwarz, P. Kodali, E. Kotler, J. E. Rice, and W. C. Swope, "DiscoveryLink: A System for Integrated Access to Life Sciences Data Services," IBM Systems Journal, Vol. 40, pp. 489-511, 2001, retains the sequence data in its original data repositories, but instead an abstract or federated view of this heterogeneous set of data sources is provided on a primary front-end database server, with a set of embedded wrapper functions on this primary front-end database providing the necessary mapping of the input queries and query results to be exchanged between the primary database and the set of back-end heterogeneous data sources.

These two general alternatives can also be used in order to use an SQL query interface in a database server for invoking various biological sequence matching algorithms. For example, these algorithms could be implemented as embedded user-defined programs, as described for the specific BLAST algorithm in S. M. Stephens, J. Y. Chen, M. G. Davidson, S. Thomas and B. M. Trute, "Oracle Database 10g: a platform for BLAST search and Regular Expression pattern matching in life sciences," Nucleic Acids Research, Vol. 33, Database issue, pp. D675-D679, 2005. Alternatively, the database wrapper approach described above can be extended, as described by B. Eckman and D. Del Prete, "Efficient Access to BLAST Using IBM DB2 Information Integrator," IBM Healthcare and Life Science Publication, 2004, for initiating the necessary calculations on a separate BLAST server, and for mapping the results back into tables on the database server. These two approaches differ quite substantially in the implementation details, but they essentially provide some important capabilities, viz., the ability to use the database SQL query interface for accessing and querying one or more data sources containing biological sequence data and metadata, and the ability to integrate sequence matching algorithms such as BLAST into these database queries. These capabilities give application developers the ability to generate complex queries such as the filtering the initial search space of sequences using predicates that involve the sequence metadata, and the post-processing the sequence matching results by joining the top-ranked sequences returned from the matching algorithms to information about these sequences in other related data repositories. In this way, the embedded implementations of sequence matching algorithms provide the capability for applications that can automate, enhance and accelerate the process of new scientific discovery from the sequence data. However, neither of the two approaches discussed above have been developed in a general way in commercial databases to support parallel implementations of these sequence matching algorithms.

There is considerable prior art in the development of parallel algorithms for biological sequence matching and alignment, which have been implemented on a variety of HPC platforms ranging from special-purpose accelerators, to multi-threaded symmetric multiprocessing systems to distributed-memory computers.

The distributed memory platforms are the most interesting from the point of view of scalability, and in this case there have been two main approaches for exploiting parallelism in biological sequence matching algorithms The first approach, termed database segmentation, partitions the target library of sequences across a set of compute nodes (preferably using sufficient compute nodes so that each individual partition of the sequence library fits within the node memory). The parallel scalability of this approach is eventually limited by the data movement overhead for distributing the library sequence data and collecting the results over a larger set of compute nodes. A study of the performance optimizations required for implementing this distributed memory parallel approach can be found in A. E. Darling, L. Carey, W. Feng, "The Design, Implementation and Evaluation of mpiBLAST," Proceedings of the Clusterworld conference (2003), with extensions for optimizing the parallel disk I/O performance in H. Lin, X. Ma, P. Chandramohan, A. Geist and N. Samatova, "Efficient data access for parallel blast," Proceedings of the International Parallel and Distributed Processing Symposium, 2005.

The second approach, termed query segmentation can be use when there is a batch of similar but independent queries, so that each query can be simultaneously executed in parallel against the target sequence library. This target sequence library can therefore be replicated across the multiple nodes of the distributed memory platform, as described in R. C. Braun, K. T. Pedretti, T. L. Casavant, T. E. Scheetz, C. L. Birkett, and C. A. Roberts, "Three Complementary Approaches to Parallelization of Local BLAST Service on Workstation Clusters," Proceedings of the 5th International Conference on Parallel Computing Technologies (PACT), Lecture Notes in Computer Science (LNCS), vol. 1662, pp. 271-282, 1999). This approach is limited by the memory on the individual nodes, which may not be sufficient for storing the entire target sequence library, but this particular difficulty can be overcome by using a combination of database and query segmentation, which is the most effective and scalable approach for distributed-memory parallel computers that have thousands of processors, as described in H. Rangwala, E. Lantz, R. Musselman, K. Pinnow, B. Smith and B. Wallenfelt, "Massively Parallel BLAST for the Blue Gene/L," High Availability and Performance Computing Workshop, Santa Fe N.M. (2005).

To our knowledge, none of the parallel implementations of BLAST (or of the other sequence matching algorithms) considers the issue of using these algorithms from an SQL query interface so that it can be used to support the support the data integration and processing of a larger query workflow. As mentioned earlier, it is also difficult to directly implement these parallel programs as embedded user-defined programs in a commercial relational database, since they make extensive use of message-passing and other parallel programming constructs that are generally not supported in database programming and runtime environments.

The BLAST algorithm has a low computational complexity (roughly linear in the size of the two input sequence strings to be matched), but there are other search and matching algorithms in bioinformatics that have a second-order or higher complexity in the size of the inputs, such as the Needleman-Wunsch algorithm, Smith-Waterman algorithm, Maximum-Likelihood matching, and Phylogenetic matching (i.e., their complexity is at least of the order of the product of the sizes of the two input sequence strings; see W. R. Pearson, "Protein Sequence comparison and Protein evolution," Intelligent Systems in Molecular Biology, 2001). The computing requirements for these algorithms are much greater than the BLAST algorithm, so that embedded user-defined programs for these algorithms would be severely performance limited on a database server that is also processing other workloads simultaneously. However, for these algorithms, the data transfer overheads from the database server to the external HPC platform will be a smaller fraction of the overall execution time when compared to an equivalent BLAST implementation. Our invention is therefore particularly suited to this case, particularly since the execution time is substantially reduced by the use of optimizations on the back-end HPC platform such as in-memory data structures and fine-grained parallelism.

Another set of life sciences applications that can be targeted by our invention is in the area of systems biology, which is the study of the relationships in various biological networks such as metabolic pathways, reaction networks, gene regulatory networks and protein-drug interactions. Many of these relationships are stored as graph structures, and biologically-interesting queries can be posed over these graphs, which may be stored in the database either as complex user-defined data types, or alternatively, materialized on-the-fly as an aggregation over a set of simpler data types (comprising of nodes, edges and property information). A Systems Biology Graph database extender for these graphical data types along with a collection of graph operations for similarity, search and inference over these data types is described in B. A. Eckman and P. G. Brown, "Graph data management for molecular and cell biology,", IBM Journal of Research and Development, vol. 50, pp. 545-560, 2006, in which many of the standard graph operations like graph isomorphism, sub-graph matching, connected components, shortest paths, spanning trees etc. have been implemented in this database extender as user-defined functions. For extremely large graphs and computationally-expensive graph algorithms, the present invention can be used to improve the query performance by off-loading some of these user-defined functions to an attached HPC platform.

Commercial relational databases are increasingly being used for storing, querying and analyzing complex data types using embedded user-defined programs, and we have discerned that there are many performance inhibitors for executing computationally-expensive user-defined programs on existing commercial database platforms.

The present invention, therefore, relates to a novel system and method for executing the compute-intensive parts of one or more from a multiplicity of database queries on a separate and independent parallel high-performance computing system. The overall dispatching and remote execution of this workload from the database server to the attached HPC platform is performed such that from the perspective of the application end-user issuing the database query, it is just as if this workload were performed by an equivalent user-defined program on the database server itself, but with better parallel performance due to the remote execution. Accordingly, in overview, the present invention discloses a computer system comprising:

A commercial database platform,

An attached high-performance computing (HPC) platform;

and

A system with a set of components for dispatching the compute-intensive sections of the query workload and the corresponding target data tables from the database platform to the attached HPC platform, the execution of this workload on this HPC platform, and the return of the results to the database system, whence these results are incorporated into the eventual result set of the original user query.

The database and HPC platforms are standard, "off-the-shelf" products with their customary systems and software stack, which are integrated by the framework in our invention for query dispatching, remote execution and results collection.

This framework also provides a "short cut" capability to invoke the compute-intensive sections of the query execution on the HPC platform directly via a web service interface. We have discerned that there may be a need during testing and development, as well as in some web-services based applications, for directly using this web-service functionality for initiating the HPC-based application against database-resident data, without the need to explicitly go through the database query interface. This web-service invocation interface, however, does not provide the advantages of the SQL query interface on the database server which can be used for complex query processing in which the remotely executed functions as an intermediate step in some database query workflow.

The details of the present invention, both as to its structure and operation, can best be understood in reference to the accompanying drawings, in which like reference numerals refer to like parts, and in which:

DETAILED DESCRIPTION OF THE INVENTION

The present invention generally relates to the off-loading of the compute-intensive user-defined operations from a database server to an attached high-performance parallel computer. The following description is presented to enable one of ordinary skill in the art to make and use the invention, and is provided in the context of a patent application and its requirements. Various modifications to the preferred embodiment and the generic principles and features described therein will be readily apparent to those skilled in the art. Thus, the present invention is not intended to be limited to the embodiment shown but is to be accorded the widest scope consistent with the principles and features described therein.

To describe the features of the present invention in detail, refer now to the following discussion along with the accompanying figures.

Figure 1:
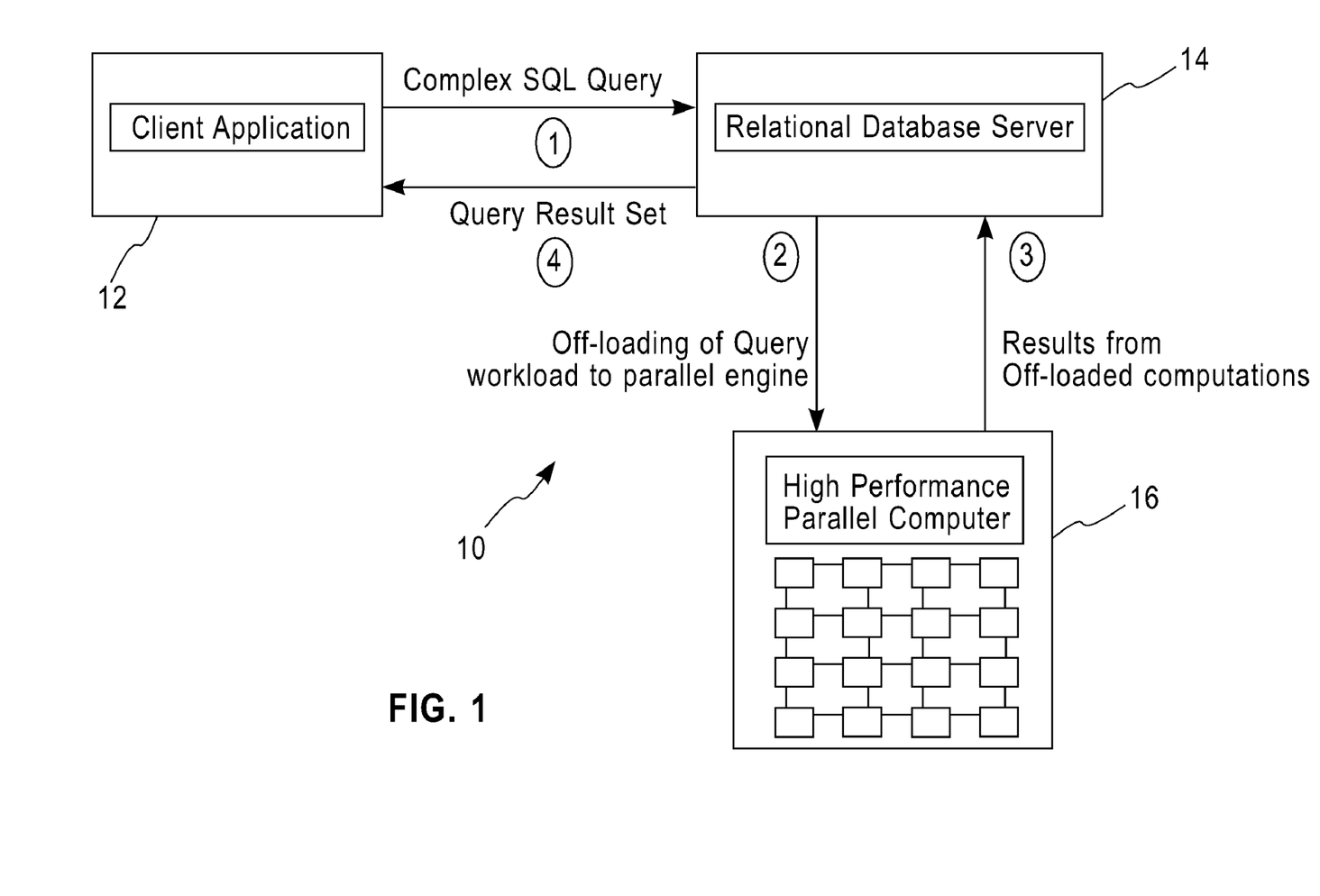
FIG. 1 illustrates the proposed invention schematically wherein a client application issues one or more SQL queries, with the compute-intensive portions of the query workload being dispatched and executed on an attached high-performance parallel computer (HPC), with the results being transmitted back to the database for final incorporation into the eventual result set returned to the client application.

FIG. 1 (numerals 10-16) is a high-level schematic of the proposed invention wherein a client application issues a SQL Query comprising of one or more compute-intensive operations in Step 1. Some or all of the computationally-intensive parts of the query workload, which might usually be implemented as embedded user-defined programs on the database server, are instead off-loaded and executed on an attached high-performance parallel computer in Step 2. The result sets from each of these off-loaded computations is transmitted back to the database for any further processing in Step 3, including any processing that may be required for integration into the result set that is eventually returned to the client application in Step 4. Two essential aspects of our invention are illustrated in FIG. 1. First, the off-loading of the compute-intensive workload to the attached parallel computer can improve the query performance and query response time on the database server for either a single query invocation, or for multiple related query invocations on the same target database table. Second, the entire process by which this performance improvement is obtained does not require significant reworking of the client application, since the execution of the user-defined program on the back-end parallel computer takes place with the same semantics and reliability as if this user-defined program was executed on the database server itself. However, the invention provides the client application with the ability to customize and optimize certain aspects of this off-loaded, remote execution using the SQL interface on the database server.

Figure 2:
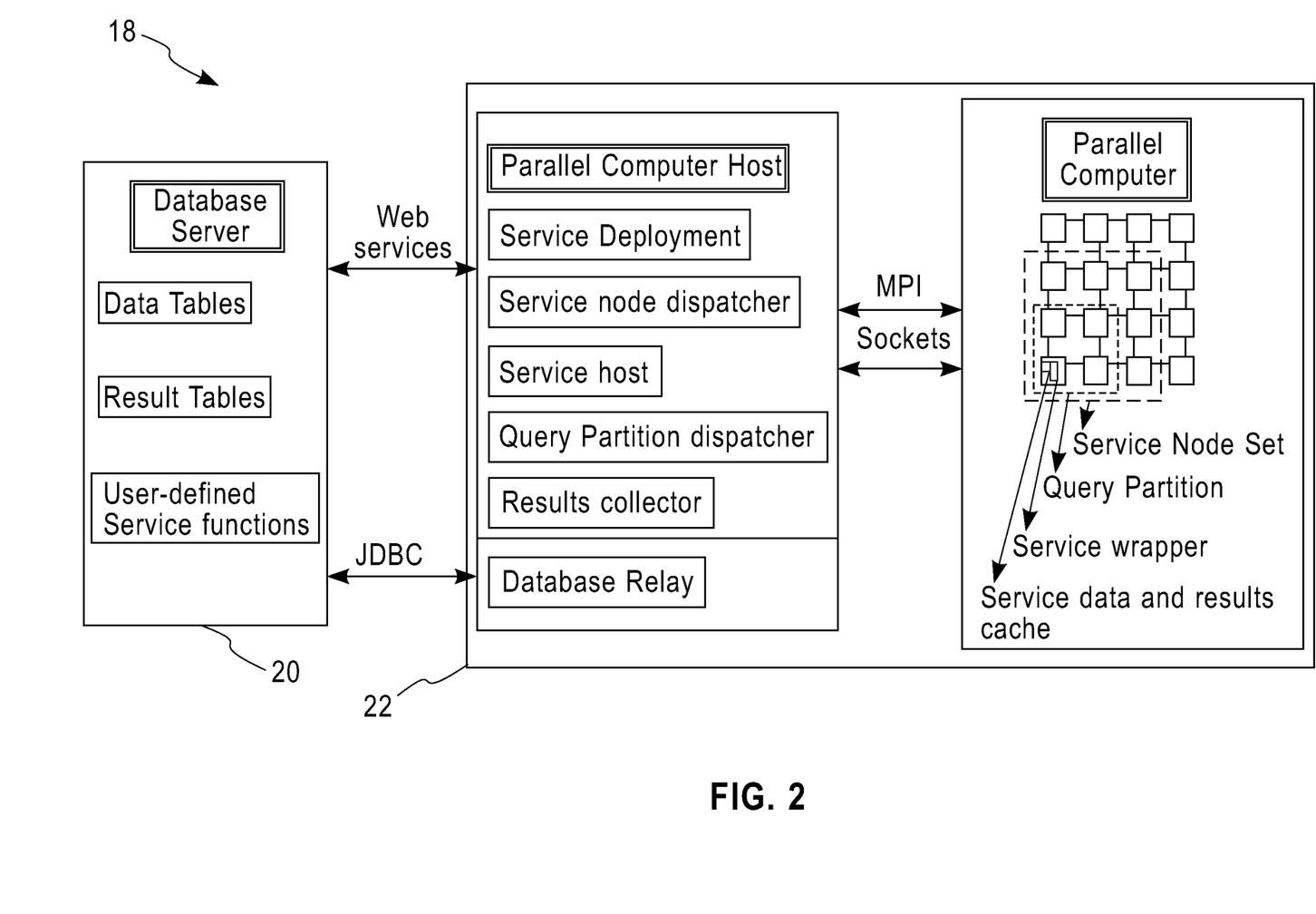
FIG. 2 illustrates the various components of the invention that may be used to generate a specific embodiment of our invention, these components being variously deployed on the database server, the host node of the parallel computer, and on the parallel computer itself.

FIG. 2 (numerals 18-22) schematically illustrates the various components that may be part of a general or specific embodiment of our invention. These components are used for initializing the services on the attached parallel computer to prepare it for executing future off-loaded computations, scheduling these computations when requested, and collecting and transmitting the results back to the database server. Typically these individual components are deployed on the parallel computer itself, or otherwise on one or more front-end host computers of the high-performance parallel computer system. Another set of components in the invention are deployed on the database server itself, and consist of user-defined program stubs that invoke the corresponding services on the back-end parallel computer using standard protocols such as web services or JDBC (Java Database Connectivity) as appropriate. In addition, the database server provides various temporary tables that may be used for storing the intermediate or final results in a given query workflow. On the HPC parallel platform itself, the main component in the invention is a service wrapper running on each parallel compute node that encapsulates the actual service on that node for executing the parallel tasks. This service wrapper is responsible for communication with the other components on the front-end host for performing the overall scheduling and synchronization. The service wrapper also stores a distinct sub-partition of the appropriate target database table or materialized view, in a form that can be efficiently accessed by the underlying node service using a simple programming interface to retrieve the required table rows (or a subset of field values in each such database table row) within each sub-partition.

As described here, the front-end host computer contains many of the important components of the invention including:

A service deployment module that is responsible for loading the application service on the required subset of the nodes of the parallel machine.

A service node dispatcher component that maintains the state on the active partitions, or the set of parallel computer nodes on which the application service has been deployed.

A query dispatcher component that in conjunction with the service node dispatcher requisitions a subset of nodes on the parallel machine for a specific service invocation, and is able to re-dispatch future queries on the same query partition if the target database table or materialized view is unchanged (thereby avoiding the overhead of again copying the target table data from the database to the parallel computer).

A results collector component that aggregates the results from the individual compute nodes on the parallel machine, and these results may be returned to the invoking service function on the database server, or they may be inserted into pre-specified temporary tables on the database server.

A database relay component that is something that is useful in the specific embodiment of the invention, since many parallel HPC platforms do not support any protocols or programming API's for interactive database access. In these cases, this database relay component manages the data transport between the database server and the parallel computer nodes, mediating between the I/O protocols used for data transfer to and from the database server, and the protocols used for data transfer to and from the parallel computer nodes.

Figure 3:
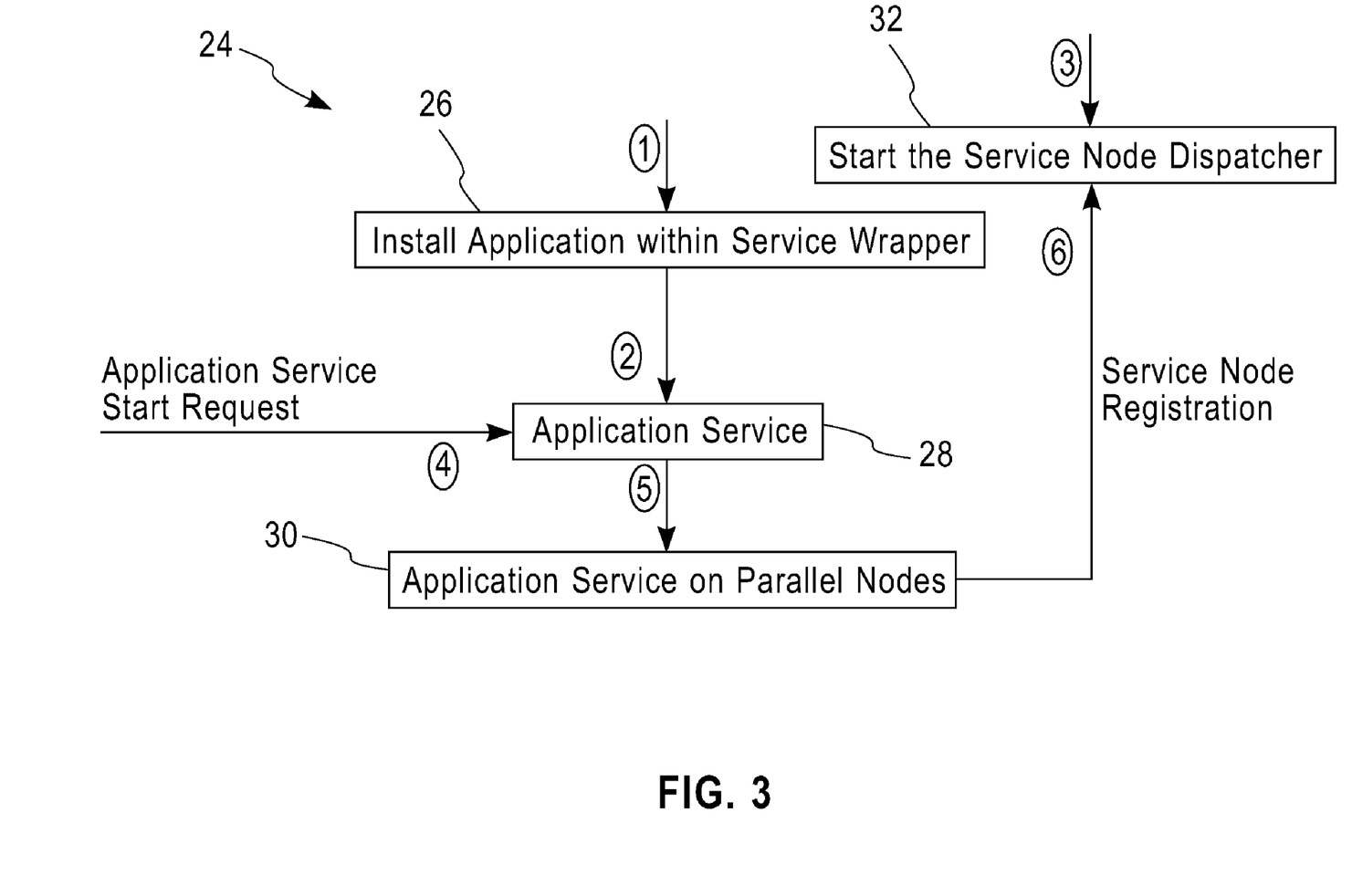
FIG. 3 illustrates the steps involved in the Phase I of the query execution where the application service that is responsible for executing the required off-loaded database queries is installed on a set of compute nodes in the parallel computer (termed the application service nodes)
Figure 4:
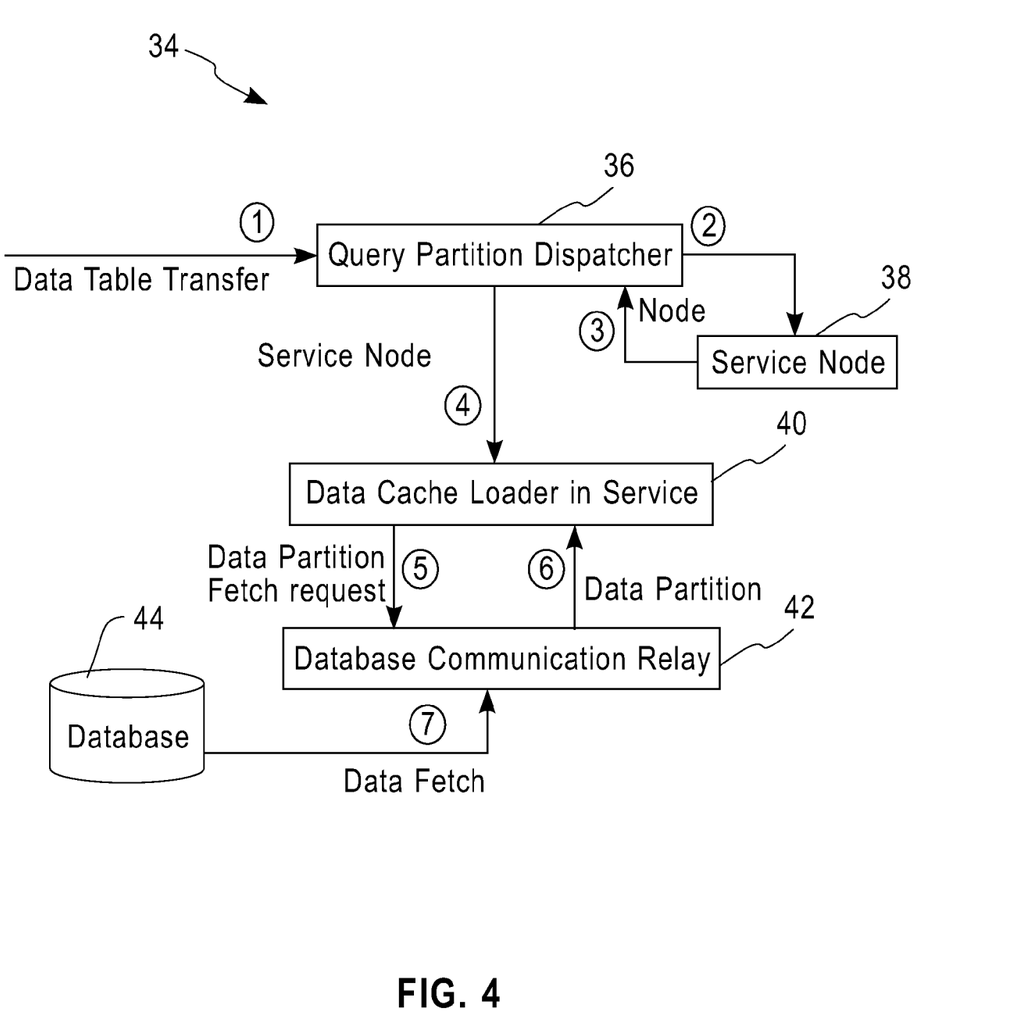
FIG. 4 illustrates the steps involved in the Phase II of the query execution where the target data library used in the query is copied to a subset of the application service nodes from Phase 1 (this subset of nodes is termed a active query partition below)
Figure 5:
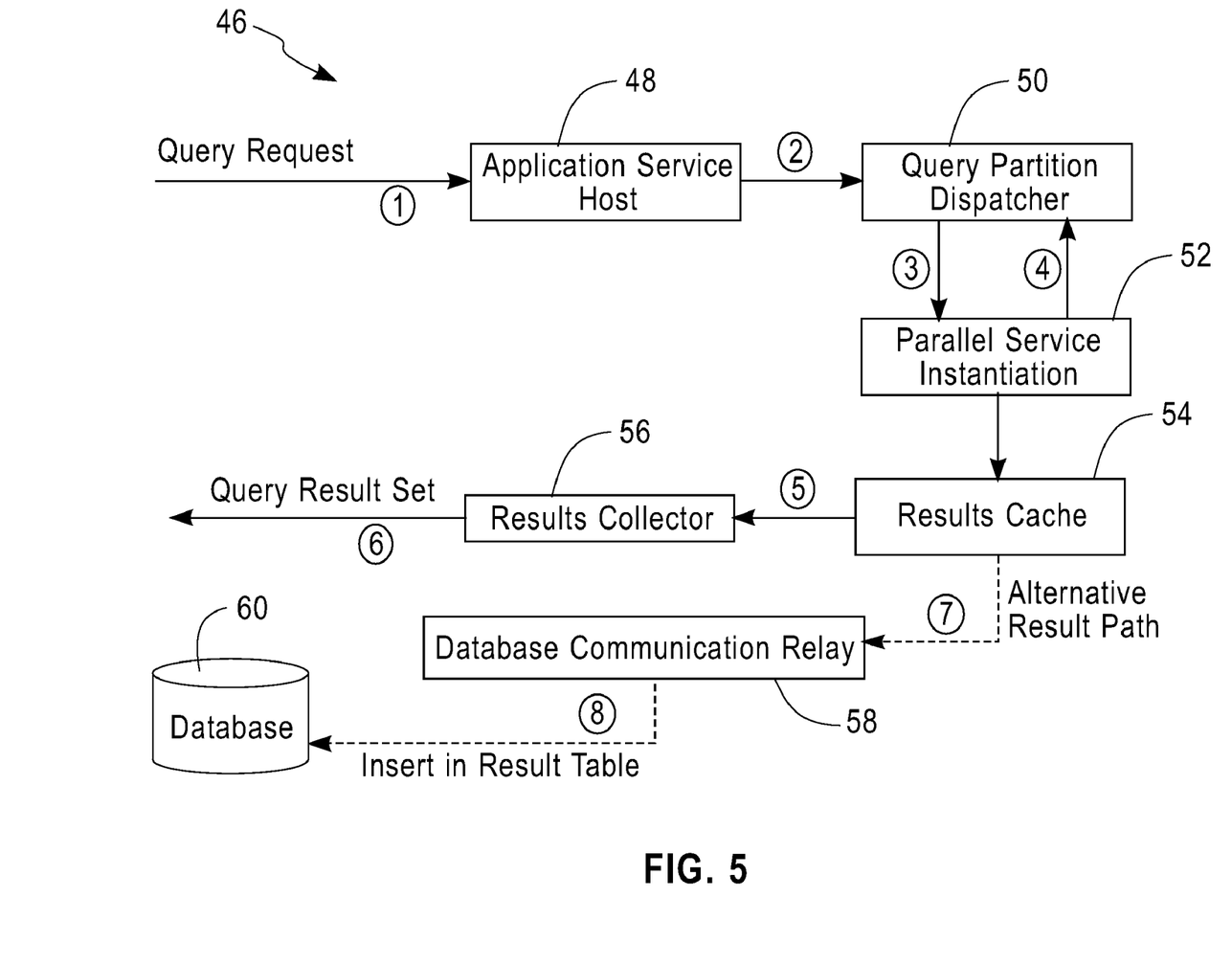
FIG. 5 illustrates the steps involved in the Phase III of the query execution where the relevant query parameters are passed to the appropriate active query partition from Phase 2, and the results are collected and returned either to the invoking database function or to a results table in the database server.

FIGS. 3 through 5 (numeral 46-60) show the sequence of steps that are required in the invention, with each figure corresponding to successive phases in the off-loaded parallel query execution. Here Phase I refers to the deployment of the application, Phase II to the data initialization, and Phase III to the execution of the off-loaded tasks on the HPC platform and return of the results to the database server.

FIG. 3 (numerals 24-32) describes the deployment phase or Phase I, where in Step 1, a person skilled in the specific art of the Application Service, provides a specific software implementation of the desired Application Service, embedded within the service wrapper that encapsulates the generic services to the Application Service as described further below. In Step 2, this Application Service (along with the service wrapper) is compiled into binaries for the individual node programs on the parallel computer, using the appropriate parallel libraries and runtime for execution on a collection of individual compute nodes on the parallel computer. In Step 3, the Service Node Dispatcher component is started on the parallel computer host, after ascertaining that this component is not initialized and running from some previous instantiation. Note that Steps 1-3 are performed by those skilled in the art, possessing specific background of the application and specific skills for executing this application on the parallel computer. In Step 4, a specific request is received from the database server, as part of its application workflow execution, wherein the program loader on the parallel computer host starts up the Application Service on a given collection of compute nodes on the parallel computer (this is usually the platform-specific loader for parallel binaries, such as MPIRUN for MPI-based applications, see http://www-unix.mcs.anl.gov/mpi). As the Application Service is loaded on these compute nodes, control is transferred to the service wrapper which initiates a message to register the node with the Service Node Dispatcher on the host computer. The Service Node Dispatcher maintains a directory and the associated count of compute nodes that are available with each specific Application Service deployed in this fashion.

FIG. 4 (numerals 34-44) describes the data initialization phase of the Application Service or Phase II, where in Step 1, a request is received from the database server to the Query Partition Dispatcher component to load the target table against which future query requests in the ensuing Phase 3 will be run. This target table, which may be obtained by combining various source database tables from the database server itself, or from some other external data source such as a ftp server, is then loaded onto a subset of the partition of nodes on which the Application Service is initialized and running. In Step 2, the Query Partition Dispatcher checks if there is an existing partition with this table loaded that is ready state for handling the new query or set of queries. If such a partition is found but is unavailable because another query is running on it, then the target table data that is already loaded on that partition can be used to clone another active query partition (so that all data transfer take place at high speed within the HPC platform system itself, rather than reverting back to the original database for this data, which has a higher communication overhead). Otherwise, if no such partition is found, then the Query Partition Dispatcher negotiates with the Service Node Dispatcher for allocating another subset of the free Application Service nodes and creates a new active query partition, as in Step 3. The service wrappers on the individual Application Service nodes of this active query partition then initiate separate data transfer requests so as to copy mutually-exclusive but collectively-exhaustive row partitions of the required data from the database server in Step 4, using the Database Relay Component as in Step 5, whence the data partition is stored in local data caches (preferably in the in-memory data caches which are in the service wrapper for the Application Service) as in Step 6. Specifically, the Database Relay component, which may be running on the parallel computer or on the parallel computer host, is used to mediate the data transfer and communication protocols between the nodes of the parallel computer and the relay host (which may be based on the MPI message passing, or a UNIX sockets type of communication protocol) in Steps 5 and 6, and between the relay host and the database server (which may be based on the JDBC protocol for database access) in Step 7. The Application Service Wrapper on the compute nodes, therefore ships the required SQL query function to the Database Relay component, which completes the query and transmits the result set back to compute nodes in the appropriate representation for being stored in the data cache maintained in the Application Service Wrapper. Subsequently, this data needs to be only read from this local data cache during the subsequent query execution phase described below, and the Application Service accesses this data using the specific AP for this purpose.

Figure 6:
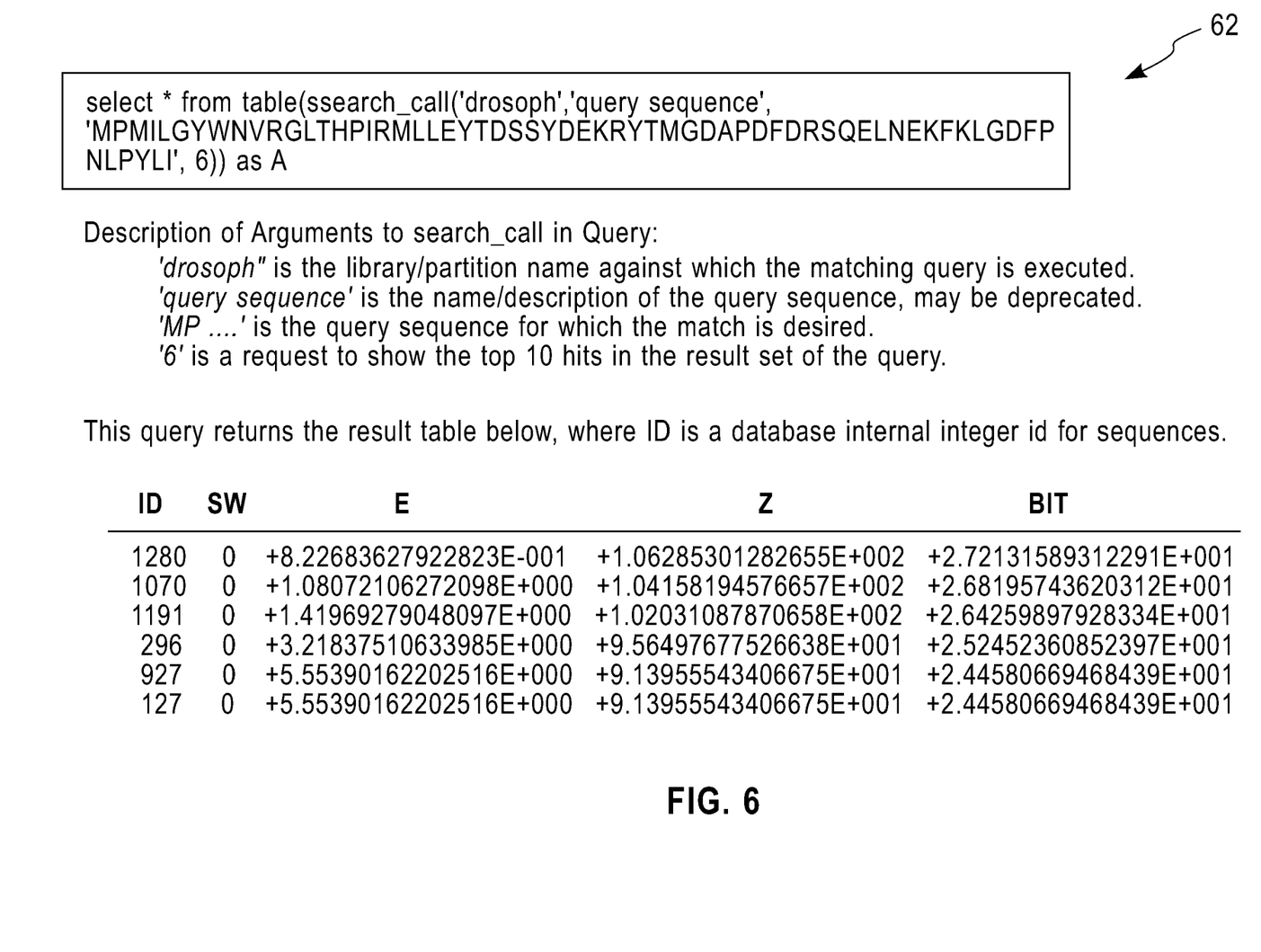
FIG. 6 illustrates an example of a query request in the particular embodiment of our invention considered below, which is issued to the database server to match a given sequence (using a parallelization of the Smith-Waterman algorithm on the remote parallel computer) against a specific target library of sequences stored in the database server and copied to an active query partition, along with the results that are returned after the remote execution.

FIG. 6 (numeral 62) describes the query execution phase or Phase III, where a query request is initiated by a user-defined function executed on the database server in Step 1. This query request encapsulates all the input parameter values that are required by the Application Service running on the nodes of the parallel computer, including the specific target table for executing the query. The endpoint for this query request is the Application Service Host component running on the front-end host of the parallel computer. In Step 2, this Application Service Host in turn inserts this query request into a set of queues maintained in the Query Partition Dispatcher in Step 2 (a separate queue is maintained for each partition that has been allocated and assigned to a specific target table in Phase 2 above). The Query Partition Dispatcher eventually submits this query request to a suitable partition in Step 3, and waits for the job completion in Step 4, with the option of generating and returning the job status code to the user-defined function in the database server issuing the application execution request. The query string itself is copied to a memory buffer allocated in the service wrapper of the Application Service of each node in the active query partition. The results of the query, which are stored in a Results Cache in the Service Wrapper of the Application Service at each node in this partition, are aggregated within the Results Collector component on the parallel computer host in Step 5, and subsequently the aggregated results data is returned to originating user-defined function on the database server as shown in Step 6. Since the originating user-defined function invoking the remote execution is either a table user-defined function or is embedded in a table user-defined function, these results can therefore be further processed as part of a complex SQL query workflow, viz, to perform ORDER BY or GROUP BY operations based on the result column values, or to join this result table to other data tables as required by overall workflow of the query execution. Alternatively, the Application Service Wrapper on each node can also use the Database Communication relay as in Phase II to directly insert the results back into a specified results table on the database as shown in Step 7 and 8 (this approach can be the default if the originating user-defined table function for the remote execution is allowed to access this results table for generating its own return table values, although on some database platforms, such user-defined table functions are typically blocked from accessing database tables).

PARTICULAR EMBODIMENTS OF THE INVENTION

For a particular embodiment, we describe a bio-informatics sequence matching application, which provides a good example of a compute-intensive algorithm that may be implemented as a user-defined program within a database, and which can therefore benefit from our invention. Specifically, we consider the SSEARCH program in the FASTA package, (available from http://helix.nih.gov/docs/gcg/ssearch.html), which provides the Smith-Waterman algorithm (T. F. Smith and M. S. Waterman, "Comparison of Bio-sequences," Advances in Applied Mathematics Vol. 2, pp. 482-489 (1981)) as implemented in W. R. Pearson, "Comparison of methods for searching protein sequence databases," Protein Science, Vol. 4, pp. 1145-1160 (1995). Compared to other sequence matching algorithms (such as BLAST discussed earlier), this is a more compute-intensive algorithm but yields highly-sensitive similarity matching results, and can be used to recover matches on even distantly-related pairs of sequences in a comparison test.

The commercial database server platform that is used in the particular embodiment is an IBM DB2 Version 9.1 (http://www.ibm.com/software/data/db2) running on a dual-processor, Xeon 2.4 GHz CPU with 2 GB of RAM storage with a 1000 Mbit Ethernet interface.

The HPC platform used for remote execution of the compute-intensive parts of the query workload consists of a single rack of an IBM Blue Gene/L e-server platform (http://www.research.ibm.com/bluegene) consisting of 1024 compute nodes, with each compute node comprising of two PowerPC 440 processors operating at 700 MHz with 512 MB of RAM storage per node. Although programs for the IBM Blue Gene/L are typically written using the MPI message-passing library, our specific use of the Blue Gene/L platform here does not require any communication libraries, although the use of such libraries is not precluded by our invention. The general approach can be adapted to other parallel computers by a person skilled in the art, and for example, multi-threaded or shared memory versions of the SSEARCH algorithms that have been implemented and benchmarked on other platforms can also be used to obtain other specific embodiments of our invention (e.g., Y. Chen, J. Mak, C. Skawratananond and T-H. K. Tzeng, "Scalability Comparison of Bioinformatics for Applications on AIX and Linux on IBM e-server pSeries 690," http://www.redbooks.ibm.com/abstracts/redp3803.html, IBM Redbook, 2004.

There can be specific technical issues in configuring other combinations of a database platform and HPC platform for realizing the present invention, which can however be resolved by a practitioner skilled in the art. For the case when this combination is the IBM DB2 database platform and the IBM Blue Gene/L parallel computer platform (as well as for other equivalent combinations of commercial database and parallel computer platforms that we are aware of) there is as yet no API or programming support for communication between the database server and the individual compute nodes on the parallel computer. For the IBM Blue Gene/L, the individual compute nodes are diskless systems that only provide a subset of the services that are available in a full standalone operating system. Therefore a separate IBM P-series server running the full Linux operating system, and connected over the local area network to the Blue Gene/L system, is used to host the various components in this invention that include:

1) A scheduler component which contains a registry of the Blue Gene/L compute-node partitions that are available for the query processing application;

2) A web server component that supports SOAP-based web services calls initiated from the database server to execute various components of the query workflow;

3) A job-submission interface component to reserve and start up applications on the compute nodes of the Blue Gene/L computer;

4) A database relay component that maintains one or more socket connections to the individual Blue Gene/L compute-nodes, and is responsible for executing various database commands relayed from the compute nodes on these socket connections, and communicating the result sets or completion codes of these database commands back to the compute nodes initiating the database query requests.

The relevant FASTA sequence databases were imported into the DB2 relational database using a simple schema, whereby for each sequence database (e.g., drosophila), the data is stored in a table consisting of the columns [id (integer), name (character string), description (character string), sequence (clob)] respectively. Here, the id field is a sequential record number, while the name (which is the NCBI identifier) and description fields are stripped from the header for each sequence in the FASTA format, using scripts to parse the FASTA databases and insert these into the corresponding DB2 table. The Drosophila database with 14331 rows (which comprises of the protein coding sequence translation of the Drosophila nucleotide database), was used for the results described herein.

The Smith-Waterman algorithm implementation is the SSEARCH program in the FASTA package (from http://helix.nih.gov/docs/gcg/ssearch.html), and the changes to this legacy code in order to implement this as an Application Service on the parallel computer were fairly minimal. The main entry point was modified to start the node service wrapper with the necessary port and address to enable it to connect to the Application Scheduler (as shown in Step 3 of FIG. 3). This node Application Service Wrapper (which contains the scratch memory for holding the appropriate partitioned subset of the target library sequences and the corresponding query result set, as well as the memory buffer for input query sequence), is then responsible for registering the Application Service client with the Application Scheduler, performing the buffer updates for the target library sequence, and for running the SSEARCH algorithm against this target library for each new query request. The FASTA package already supports an extensive list of file and database formats for reading the target library sequences, so that the access functions for accessing data from the scratch memory of the node Service Wrapper can be easily added as yet another input source.

Therefore, in summary, the generic components that were required, in addition to the FASTA package application for enabling this specific embodiment included the compute-node Service Wrapper functionality, the access functions for the node Service Wrapper scratch memory, and the Database Relay component, and all these components provide a re-used by a wide class of Application Services similar to SSEARCH in the FASTA package.

An example of a SQL query based on this specific embodiment is shown in FIG. 6. This query initiates the DB2 user-defined table function ssearch_call with a parameter list that includes the target sequence library, a descriptor string for the input sequence to be matched, the input sequence itself, and the number of top-ranked matches that are desired. When invoked from an SQL query interface as shown, the matching and ranking is performed on the Blue Gene/L compute nodes and the results are returned as shown in FIG. 2. Speedup and performance measurements will be provided in the final version of the patent.

What is claim is:

1. A computer system comprising:
   (i) a high-performance parallel computing (HPC) platform that does not include a database system;
   (ii) a general-propose database platform configured to process one or more queries without the HPC platform;
   (iii) a means for transferring compute-intensive user-defined workloads and corresponding data views that form part of the workflow for the one or more queries on the database platform from the database platform to the HPC platform for execution on the HPC platform and for creating fast replicas of database data in the HPC platform so that a set of simultaneous, independent, compute-intensive workloads originating from a corresponding set of simultaneous, independent, parallel queries on the database platform is executed on the HPC platform; and
   (iv) a means for returning the results from the workload executed on the HPC platform back to the database platform, in order to incorporate these results into eventual result set of the one or more queries;
   (v) a database relay component that controls transferring the workloads and corresponding data views between the HPC platform and the database platform and renders the transferred workloads and corresponding data views compatible in the HPC platform and in the database platform,
   Wherein the HPC platform supports parallel execution for either shared memory or distributed memory message—passing applications, thereby supporting programming models that are not supported in the database platform,
   wherein a communication processing overhead between the general-purpose database platform and the HPC platform is reduced by the transferring the compute-intensive user-defined workloads and corresponding data views or the creating the replicas, or both.

2. A system according to claim 1, wherein the high-performance parallel computing system deploys greater computational resources in terms of processing units and fast memory so that the transferred compute-intensive workload can be executed in a highly efficient manner, when the workload comprises of either a single query, or of a sequence of similar or related queries, or a set of simultaneous independent queries.

3. A system according to claim 2, where the high-performance parallel computing platform implements a shared memory structure or a distributed memory structure to cache table data within the shared memory structure or the distributed memory structure for faster computational processing, as well as to enable a sequence of compute-intensive workloads generated by a sequence of queries on same table data to be efficiently executed without requiring further exchange of data between the database platform and the high-performance parallel computing platform for each new query invocation.

* * * * *